(12) United States Patent
Hagiwara (10) Patent No.: US 7,697,841 B2
(45) Date of Patent: Apr. 13, 2010

(54) CAMERA (75) Inventor: Kosuke Hagiwara, Edogawa-ku (JP)

(73) Assignee: Nikon Corporation, Tokyo (JP)

( * ) Notice: Subject to any disclaimer, the term of this patent is extended or adjusted under 35 U.S.C. 154(b) by 356 days.

(21) Appl. No.: 11/976,410

(22) Filed: Oct. 24, 2007

(65) Prior Publication Data
US 2008/0101790 A1 May 1, 2008

(30) Foreign Application Priority Data
Oct. 30, 2006 (JP) ............................. 2006-293673

(51) Int. Cl.
G03B 21/00 (2006.01)
H04N 5/222 (2006.01)
(52) U.S. Cl. .................................... 396/430; 348/333.1
(58) Field of Classification Search ................. 396/429, 396/430, 431; 348/333.1
See application file for complete search history.

(56) References Cited

U.S. PATENT DOCUMENTS 5,258,844 A * 11/1993 Nakayama et al. ....... 348/333.1
5,528,297 A * 6/1996 Seegert et al. ............ 348/333.1

FOREIGN PATENT DOCUMENTS

JP A 2005-250392 9/2005

* cited by examiner

Primary Examiner—Rodney E Fuller
(74) Attorney, Agent, or Firm—Oliff & Berridge, PLC (57) ABSTRACT A camera includes: a photographic optical system that comprises a plurality of lenses; an image sensor that captures an image of a photographic subject formed through the photographic optical system; a projection lens unit that projects an image for projection via a projection lens unit, with at least one lens being common to the plurality of lenses of the photographic optical system and to the projection lens unit; and a shift mechanism that sets the at least one common lens to one of a first position upon an optical axis of the photographic optical system and a second position upon an optical axis of the projection lens unit.

6 Claims, 8 Drawing Sheets

CAMERA

INCORPORATION BY REFERENCE

The disclosure of the following priority application is herein incorporated by reference:

Japanese Patent Application No. 2006-293673, filed Oct. 30, 2006.

BACKGROUND OF THE INVENTION

1. Field of the Invention

The present invention relates to a camera that is equipped with a projector.

2. Description of Related Art

A camera equipped with a projector is disclosed in Japanese Laid-Open Patent Publication 2005-250392. With the camera described in this publication, the projector is installed in the main body of the camera, and an image is projected upon a screen by employing a projection optical system for the projector.

SUMMARY OF THE INVENTION

A camera according to a 1st aspect of the present invention includes: a photographic optical system that comprises a plurality of lenses; an image sensor that captures an image of a photographic subject formed through the photographic optical system; a projection lens unit that projects an image for projection via a projection lens unit, with at least one lens being common to the plurality of lenses of the photographic optical system and to the projection lens unit; and a shift mechanism that sets the at least one common lens to one of a first position upon an optical axis of the photographic optical system and a second position upon an optical axis of the projection lens unit.

According to a 2nd aspect of the present invention, in the camera according to the 1st aspect, the projection lens unit may include a plurality of lenses; and the common lens may serve both as at least one lens among the plurality of lenses of the photographic optical system and as at least one lens of the projection lens unit.

According to a 3rd aspect of the present invention, in the camera according to the 1st aspect, it is preferable that the shift mechanism shifts the common lens within a plane that is orthogonal to the optical axes, and selectively positions the common lens to the first position or the second position.

According to a 4th aspect of the present invention, in the camera according to the 1st aspect, it is preferable that the camera is a retractable type camera in which a lens barrel comprising the photographic optical system is to be retracted within a camera body, and when the lens barrel is retracted, the common lens is positioned by the shift mechanism to the second position.

According to a 5th aspect of the present invention, in the camera according to the 1st aspect, it is preferable that the shift mechanism positions the common lens to the first position or to the second position by rotating the common lens around a rod disposed in parallel with the optical axes, as a center.

According to a 6th aspect of the present invention, in the camera according to Claim the 5th aspect, the shift mechanism may include a cam mechanism that has a claw formed upon a lens frame that supports the common lens and a cam member, and rotate the lens frame by driving one of the lens frame and the claw along a direction of the optical axes, with the claw contacting against a sloping surface of the cam member.

BRIEF DESCRIPTION OF THE DRAWINGS

FIGS. 1A and 1B are figures for explanation of an embodiment of the present invention: FIG. 1A shows the state of a camera during photography, while

FIGS. 2A and 2B are figures showing the details of a third lens group and of a fourth lens group: FIG. 2A shows the state thereof during photography, while

FIGS. 8A through 8C are figures for explanation of the operation of this second variant embodiment.

DESCRIPTION OF THE PREFERRED EMBODIMENTS

Figure 1A:
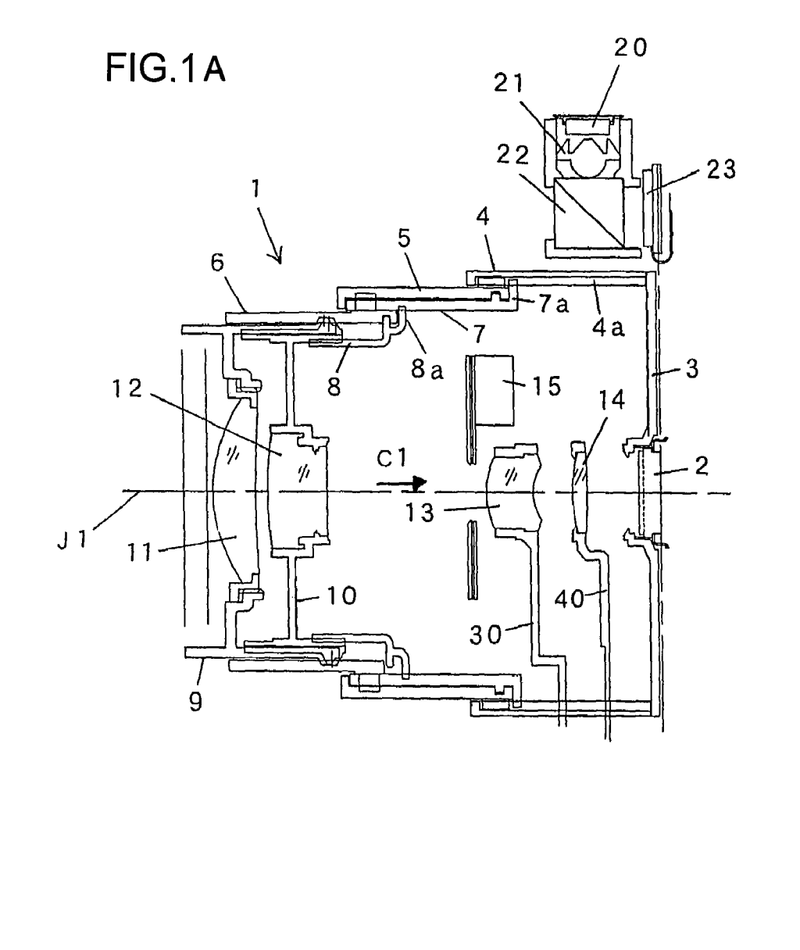
Figure 1B:
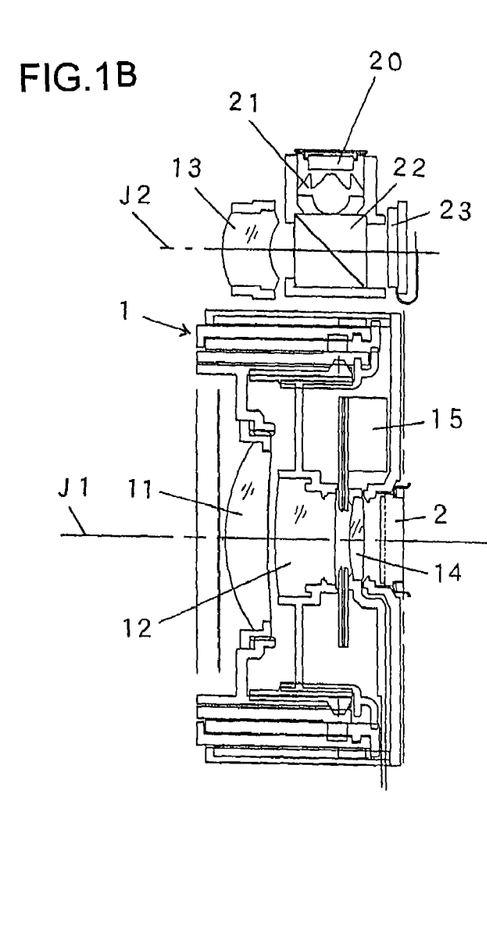
FIG. 1B shows the state thereof when photography is not taking place.

In the following, preferred embodiments for implementation of the present invention will be explained with reference to the drawings. FIGS. 1A through 4 are figures for explanation of an embodiment of the present invention, and show the general structure of a photographic optical system and of a projection optical system of a camera that is equipped with a projector. FIGS. 1A and 1B are figures showing a cross section of this camera; FIG. 1A shows the camera in a photographic state thereof, that corresponds to its mode during photography (camera mode). On the other hand, FIG. 1B shows the camera in a non-photographic state thereof, that corresponds to its mode when its power supply is off and to its mode when the projector is in use (projector mode). In this non-photographic state a lens barrel 1 is in a retracted state, while in the photographic state the lens barrel 1 is pulled out from this retracted state to an initial position (termed its wide state).

The camera of this embodiment is a camera that uses a solid state image sensor 2 such as a CCD element or a CMOS element or the like as a means for capturing an image of a photographic subject, and here, by way of example, the case in which a CCD element is used as this solid state image sensor 2 will be explained. The CCD 2 is fixed upon a CCD mount 3. To the lens barrel 1 there are provided a fixed barrel 4 that is fixed to the CCD mount 3, an intermediate barrel 5 that shifts along the direction of a photographic optical axis J1 while rotating with respect to the fixed barrel 4, and a cam barrel 6 that shifts along the direction of the optical axis J1 while rotating in synchronization with the intermediate barrel 5.

Rectilinear motion barrels 7 and 8 are provided at the insides of the intermediate barrel 5 and of the cam barrel 6. Along with the rectilinear motion barrel 7 being provided so as to rotate freely with respect to the intermediate barrel 5, a key 7a is provided at the rear end of the barrel 7 so as to engage with a rectilinear motion guide 4a of the fixed barrel 4. Due to this, the rectilinear motion barrel 7 shifts along the direction of the optical axis J1, but does not rotate. In a similar manner, along with the rectilinear motion barrel 8 being provided so as to rotate freely with respect to the cam barrel 6, a key 8a is provided at the rear end of the barrel 8 so as to engage with a rectilinear motion guide (not shown in the figures) for this rectilinear motion barrel 8, and thereby the rectilinear motion barrel 8 shifts along the direction of the optical axis J1 but does not rotate.

A lens barrel 9 that supports a first lens group 11 and a lens barrel 10 that supports a second lens group 12 are both driven along the direction of the optical axis J1 by the cam barrel 6. The lens barrel 10 that supports the second lens group 12 is guided along the direction of the optical axis J1 by the rectilinear motion barrel 8, while the lens barrel 9 that supports the first lens group 11 is guided along the direction of the optical axis J1 by the lens barrel 10. Due to this, when the cam barrel 6 rotates, the lens barrels 9 and 10 are driven in rectilinear motion along the direction of the optical axis J1.

As will be described in detail hereinafter, a third lens group 13 and a fourth lens group 14 are driven in rectilinear motion by stepping motors. Furthermore, although this feature is not shown in the figures, to a shutter unit 15 there is provided a cam pin that is engaged with a cam groove of the intermediate barrel 5 that pierces through a rectilinear motion guide of the rectilinear motion barrel 7. Due to this, the shutter unit 15 is driven in rectilinear motion along the direction of the optical axis J1 by the rotation of the intermediate barrel 5. These lens groups constitute a zoom lens unit, and zoom operation is performed by driving the first lens group 11, the second lens group 12, and the third lens group 13, while focus operation is performed with the fourth lens group 14.

Next, the projector unit will be explained. This projector unit includes a light source 20, a condensing lens 21, a polarized light beam splitter 22, and a LCOS 23 (Liquid Crystal upon Silicon as a reflective type liquid crystal element). Furthermore, with the camera of this embodiment, when the projector is in use, the third lens group 13 of a camera unit also serves as a projection lens for the projector unit, and when photography is not taking place (i.e. in projector mode), as shown in FIG. 1B, the third lens group 13 is disposed upon an optical axis J2 of the projector unit. In other words, the third lens group 13 is a common lens unit which is common to a photographic optical system of the camera unit and to a projection optical system of the projector unit.

The illumination light emitted from the light source 20 is incident upon the polarized light beam splitter 22 via the condensing lens 21. The S polarized light in this illumination light is reflected by the polarized light beam splitter 22, and is incident upon the LCOS 23. An image signal related to an image to be projected is inputted to the LCOS 23, and the S polarized light that is incident is reflected by the LCOS 23. This inputted image signal may be the image signal for a photographic image that has been photographed by the camera unit, may be a replay image signal for an image that is recorded upon a recording medium of the camera, or the like.

When reflected by the LCOS 23, the incident light is subjected to modulation based upon this image signal, and thereby modulated light in a light polarization state corresponding to the image information is emitted from the LCOS 23, and is again incident upon the polarized light beam splitter 22 for a second time. The S polarized light in this modulated light that is incident upon the polarized light beam splitter 22 is reflected, and only the P polarized light therein is transmitted. This P polarized light that has passed through the polarized light beam splitter 22 is projected upon a screen not shown in the figures by the projection lens 13 (i.e. by the third lens group 13).

Although in this embodiment the projection lens 13 consists of a single lens, a projection lens unit that consists of a plurality of lenses may also be used. It should be understood that, if the projection lens 13 is a projection lens unit that consists of a plurality of lenses, then it would be acceptable to dispose in the projector unit in advance a lens that does not also serve as part of the photographic optical system, and for one lens only to serve both in the projector system and also in the photographic optical system; and it would also be acceptable for a plurality of lenses to serve in both these systems.

Figure 2A:
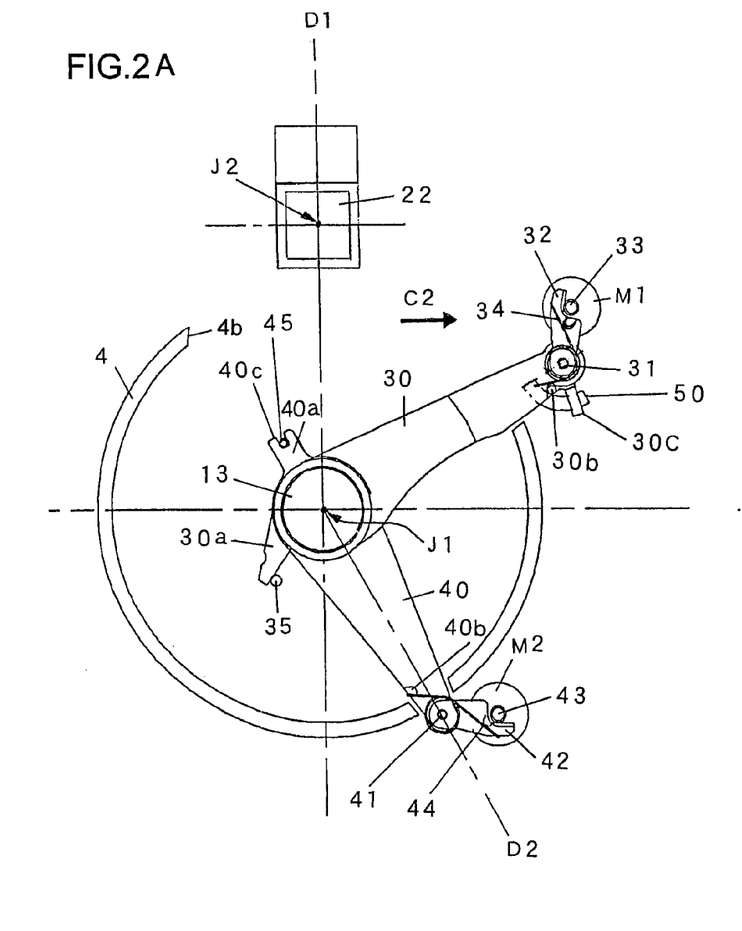
Figure 2B:
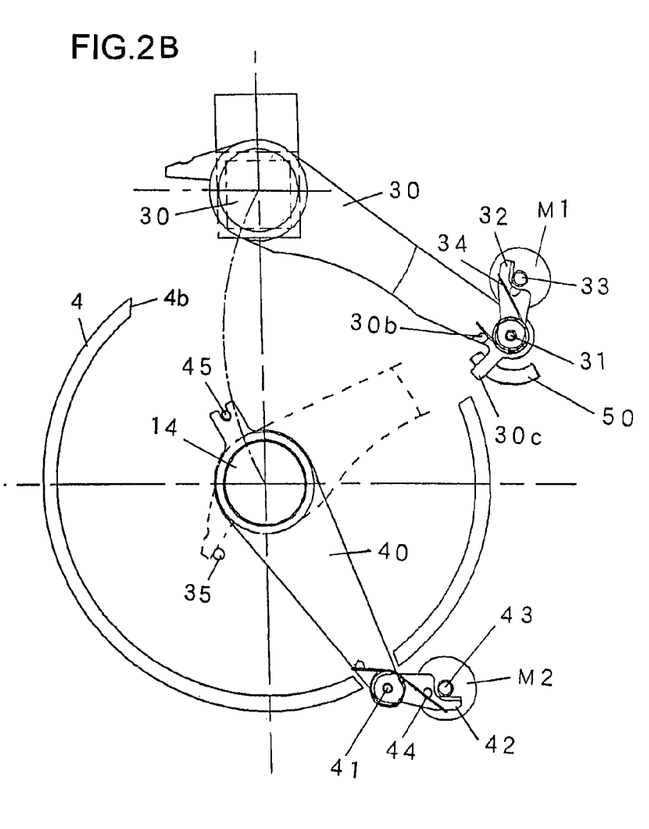
FIG. 2B shows the state thereof when photography is not taking place.

With the camera of this embodiment, by shifting the third lens group 13 to and fro between the optical axes J1 and J2, it is arranged for a lens in the photographic optical system also to serve as a projection lens in the projection optical system. It is to be noted that the optical axis J1 of the photographic optical system and the optical axis J2 of the projection optical are substantially parallel to each other. FIGS. 2A and 2B are figures for explanation of the third lens group 13 and the fourth lens group 14, and are views of the mechanism as seen along the direction of the arrow C1 in FIG. 1A. FIG. 2A shows the case when the camera is in its photographic state, while FIG. 2B shows the case when the camera is in its non-photographic state. Thus, FIGS. 1A and 1B are sectional views taken along the angled plane defined by D1-J1-D2 in FIGS. 2A and 2B. Furthermore, FIG. 3 is a view of the mechanism as seen in the direction shown by the arrow C2 in FIG. 2A.

The third lens group 13 is supported upon a lens frame 30, and a rod 31 that extends in a direction parallel to the optical axis J1 is passed through the opposite side of the lens frame 30 from its lens support portion. Furthermore, a rack 32 is provided upon the portion of the lens frame 30 through which the rod 31 is passed. The lens frame 30 and the rack 32 are linked so as to be able freely to rotate with respect to one another about the rod 31 as a rotational center. Furthermore, the lens frame 30 and the rack 32 can shift along the rod 31 as one unit.

Figure 3:
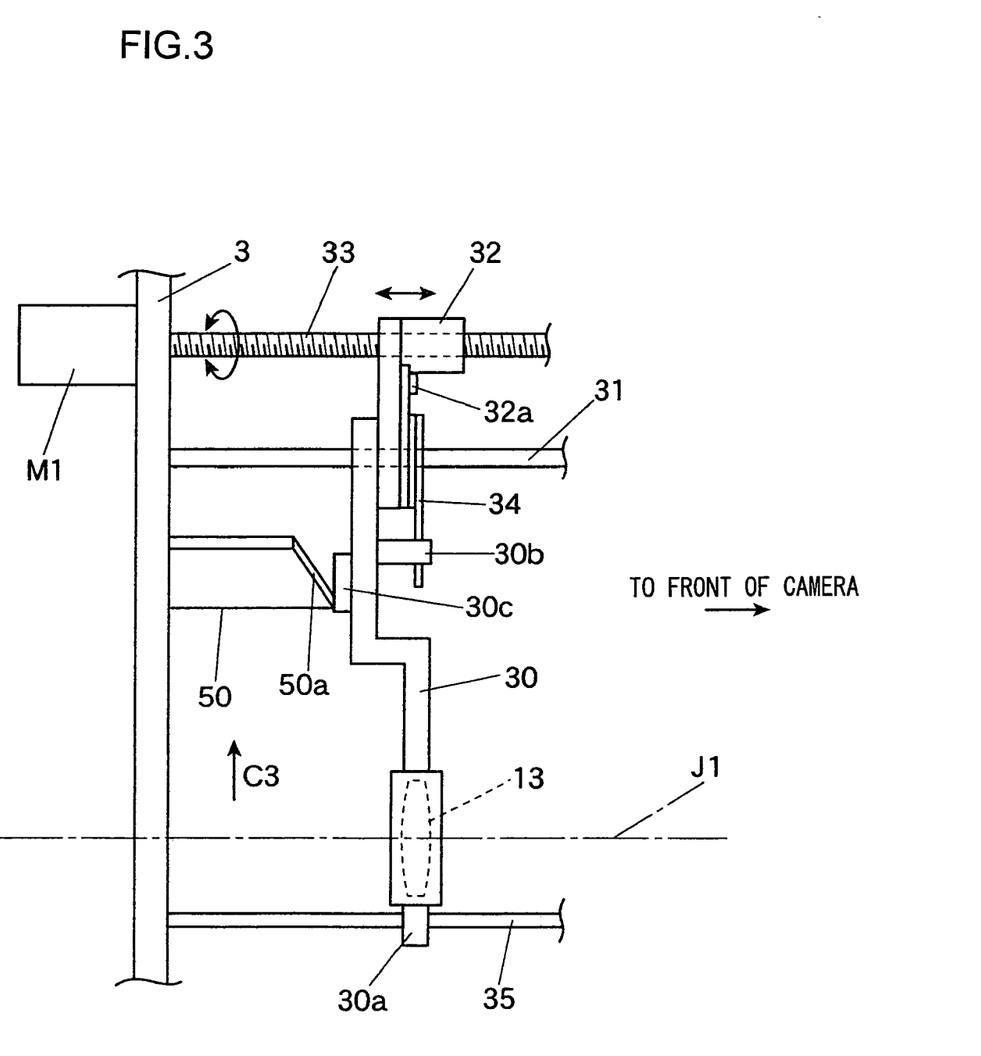
FIG. 3 is a figure for explanation of the relationship between a claw and a cam member during a swing operation.

One end of a torsional coil spring 34 is hooked upon a claw 30b of the lens frame 30, while its other end is hooked upon a claw 32a of the rack 32 (refer to FIG. 3). Due to this, the rack 32 is biased by this torsional coil spring 34 so as to rotate in the clockwise direction as seen in FIG. 2A, and moreover it is engaged upon a lead screw 33 that is provided so as to lie parallel to the rod 31, by being screwed thereupon. Conversely, the lens frame 30 is biased by the torsional coil spring 34 so as to be rotated in the anticlockwise direction.

A rod 35 for position determination is provided so as to lie parallel to the rod 31. By a claw 30a that is provided upon the lens frame 30 contacting against this rod 35, the position of the third lens group 13 is set so as to lie upon the photographic optical axis J1. When the lead screw 33 is rotationally driven by a stepping motor M1, the lens frame 30 and the rack 32 are driven in rectilinear motion along the photographic optical axis J1 as one unit. The rod 31 is provided on the outside of the fixed barrel 4, and the lens frame 30 that is fitted upon this rod 31 is inserted to within this fixed barrel 4 from the cutaway 4b that is formed in the side of the fixed barrel 4.

The position of the lens frame 30 shown in FIG. 3 corresponds to when the lens frame 30 is positioned in its initial state shown in FIG. 1A, with a claw 30c that is formed upon the lens frame 30 being contacted against a sloping surface 50a of a cam member 50. This cam member 50 is formed so as to project from the CCD mount 3 towards the front of the camera. As will be described hereinafter, when the lens frame 30 moves further back from this initial position thereof, the lens frame 30 is made to swing by a cam mechanism constituted by this claw 30c and cam member 50.

A similar construction as that described above for the lens frame 30 is provided in relation to a lens frame 40 of the fourth lens group 14 as well, with the omission of the claw 30c and the cam member 50a. In other words, this lens frame 40 includes a claw 40b upon which one end of a torsional coil spring 44 is hooked, and a claw 40a having a cutaway 40c that is engaged upon a rod 45. A rack 42 is also provided on the lens frame 40, with the rack 42 freely rotatable about a rod 41 as a rotational center. By the rod 45 and the cutaway 40c being engaged together, the position of the fourth lens group 14 is set so as to lie upon the photographic optical axis J1. The rack 42 is screwed upon a lead screw 43 that is rotationally driven by a stepping motor K2. And, when the lead screw 43 is thus rotationally driven, the lens frame 40 is driven in rectilinear motion along the photographic optical axis J1.

Figure 4:
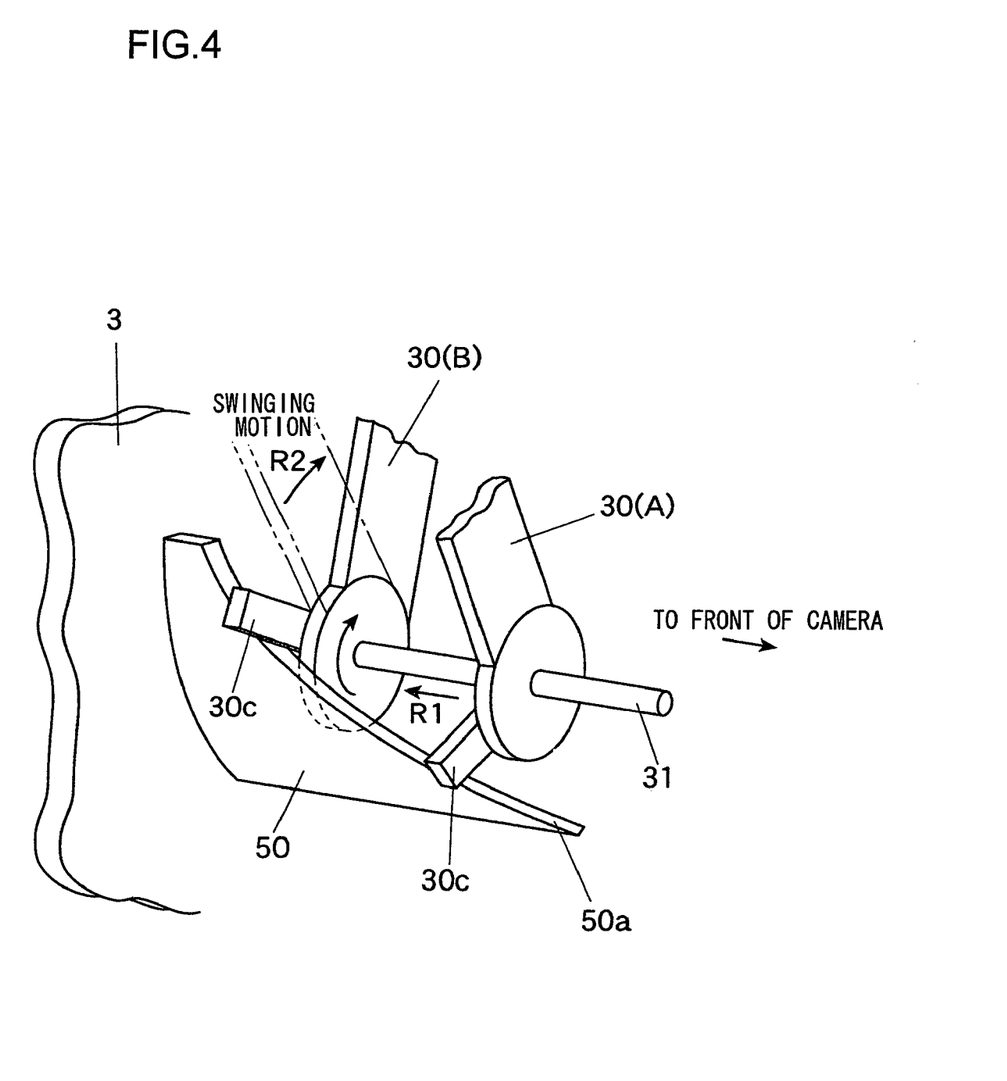
FIG. 4 is a perspective view for explanation of a swing operation of a lens frame.

FIG. 4 is a figure for explanation of the to-and-fro operation or swing operation of the lens frame 30, and is a perspective view showing the relationship between the cam member 50 and the lens frame 30. The reference symbol 30(A) shows the lens frame in its initial position, while the reference symbol 30(B) shows the lens frame when it has been brought backwards in the camera from its initial position. The cam member 50 is a plate shaped member that describes a circular arc about the rod 31 as a center, and is formed with a sloping surface 50a. In its initial position, the claw 30c of the lens frame 30(A) contacts against the lower end region of this sloping surface 50a.

When the motor M1 is driven and the lens frame 30 is retracted towards the rear side of the camera as shown by the arrow sign R1, the contacting portion of the claw 30c is elevated by the sloping surface 50a. Due to this, the portion at which the claw 30c is provided is rotated around the rod 31 as a center against the biasing force of the torsional coil spring 34. As a result, the lens frame 30 is driven as shown by the arrow sign R2, so that the third lens group 13 is shifted from lying upon the photographic optical axis J1 to the optical axis J2 of the projector unit.

The series of operations from the retracted state of FIG. 1B to the initial state of FIG. 1A will now be explained. A switch that sets the selection of the camera mode or the projector mode is provided to this camera, and, when the power supply of the camera is turned ON, the camera is started in the mode that is set by this switch. For example, if the camera has been started in the projector mode, then after starting the retracted state of FIG. 1B is maintained.

On the other hand, if the camera has been started in the camera mode, then the lens barrel 1 is pulled out from the retracted state of FIG. 1B. To thus pull out the lens barrel 1 from its initial position, the stepping motors M1 and M2 are driven, so that the lens frames 30 and 40 of the third lens group 13 and the fourth lens group 14 are shifted to their initial positions. Although in the retracted state the claw 30c of the lens frame 30 is contacting against the upper end region of the sloping surface 50a as shown in FIG. 4 (i.e. is in the state shown by the reference symbol 30(B)), when the lens frame 30 is shifted forwards in the camera towards its initial position, this claw 30c shifts over the sloping surface 50a towards its lower end region, and the lens frame 30 is driven back into the fixed barrel 4.

And, when the shifting of the lens frame 30 to its initial position has been completed, the position of the third lens group 13 is set to its initial position upon the photographic optical axis J1. It should be understood that, although the shifting of the third and fourth lens groups 13 and 14 to their initial positions is performed after the pulling out of the lens barrel 1 to its initial position is completed, it would also be acceptable to perform the pulling out of the lens barrel 1 and the shifting of the third and fourth lens groups 13 and 14 simultaneously.

Conversely, when changing over to the projector mode from the camera mode, first the first through the fourth lens groups 11 through 14 are returned to their initial positions. Next, the third and fourth lens groups 13 and 14 are retracted further from their initial positions, and the lens frame 30 is driven so that the third lens group 13 is swung onto the optical axis J2 of the projector unit. Thereafter, the retraction operation of the lens barrel 1 is performed. The first lens group 11 and the second lens group 12 are stored in the space where the third lens group 13 would have been stored, and thereby the retracted state shown in FIG. 1B (the non-photographic state) is reached. In this case as well, it would also be acceptable to perform the return operation for the third and fourth lens groups 13 and 14 and the retraction operation of the lens barrel 1 simultaneously.

As explained above, in this embodiment, since it is arranged for the third lens group 13 of the camera unit also to serve as a projection lens for the projector unit, therefore, along with it being possible to keep the cost low as compared with a conventional camera in which the projection lens for the projector was provided separately from the lens for the camera, also it is possible to suppress increase in the weight of the camera. Moreover, in the case of a retractable lens barrel type camera such as the one described above, since when retracted the third lens group 13 is shifted to the projector unit, accordingly it is not necessary to provide any space for accommodating the third lens group 13 on the side of the photographic lens, so that it is possible to make the size of the camera when the lens barrel is retracted smaller.

It should be understood that the camera of the embodiment described above may be varied in the following ways.

Variant Embodiment #1

Figure 5:
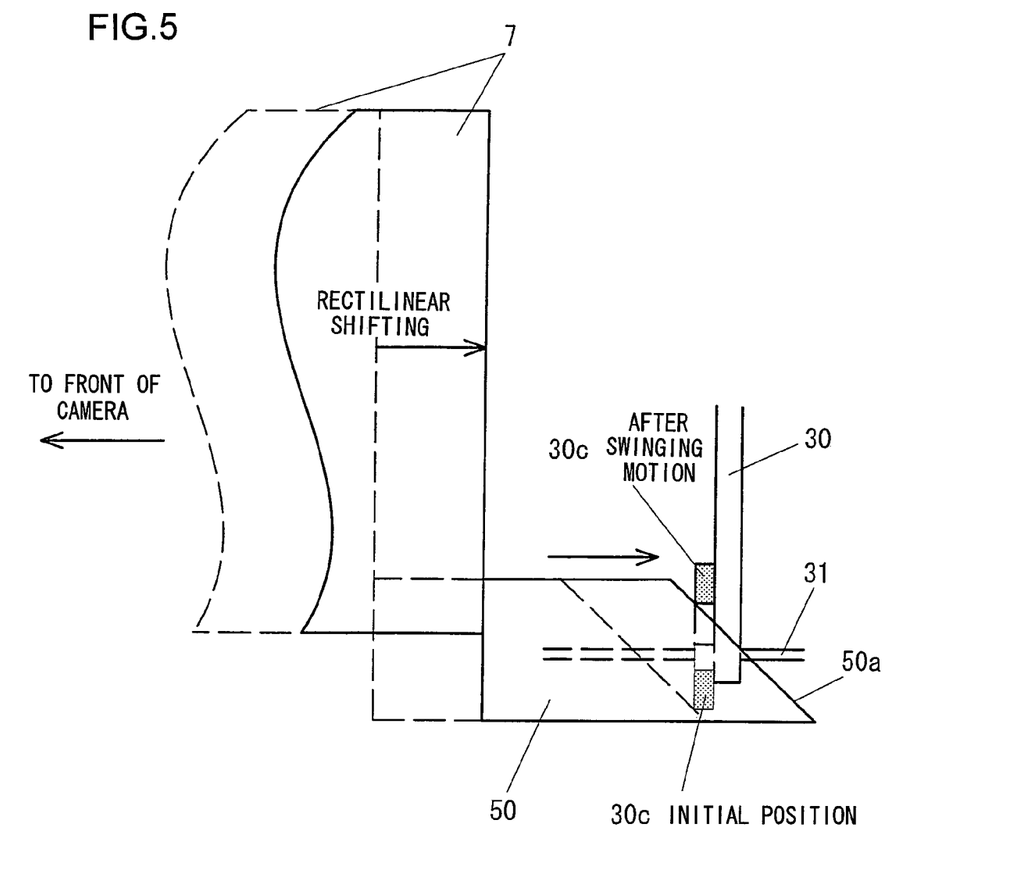
FIG. 5 is a figure for explanation of a first variant embodiment, and is a figure showing a rectilinear motion barrel and a lens frame seen from the side of the camera.

In the embodiment described above, the third lens group 13 was retracted from the photographic state shown in FIG. 1A (the position of the lens frame 30 shown in FIG. 3) in the direction of the CCD mount 3, and the claw 30c of the lens frame 30 was driven to swing by its contact against the sloping surface 50a of the cam member 50. Due to this, the position of the third lens group along the direction of the optical axis was different when it was in its photographic state (i.e. its initial position) and when it was in its non-photographic state. By contrast, in this variant embodiment, by providing the cam member 50 against which the claw 30c contacts at the rear end of the rectilinear motion barrel 7 as shown in FIG. 5, it is arranged for the position of the lens frame 30 along the optical axis in its initial position and the position of the lens frame 30 along the optical axis in the non-photographic state to agree with one another. It should be understood that FIG. 5 is a figure showing portions of the rectilinear motion barrel 7 and the lens frame 30, as seen from the side of the camera.

When the retraction operation starts from the photographic state (the initial position) shown in FIG. 1A, the cam member 50 of the rectilinear motion barrel 7 moves backward, and the claw 30c of the lens frame 30 shifts upwards upon the sloping surface 50a. As a result the lens frame 30 is driven, and the third lens group 13 is shifted, from being upon the optical axis J1 of the photographic optical system, onto the optical axis J2 of the projection optical system. In the case of this variant embodiment #1, since the cam member 50 shifts with respect to the claw 30c of the lens frame 30, accordingly the position of the lens frame 30 along the direction of the optical axis of does not change between the photographic state (the initial position) and the non-photographic state.

In the case of the structure shown in FIGS. 1A, 1B, 2A, and 2B of the first embodiment described above, since it is arranged for the lens frame 30 to be driven by being moved rearwards, accordingly it is necessary to position the projector unit to the rear by the same amount as this rearwards motion. On the other hand since, in the case of this variant embodiment #1, when shifting the third lens group 13 between the optical axes J1 and J2, it is arranged to swing the lens frame 30 within a plane that is orthogonal to the optical axis, accordingly it is possible to reduce the dimension or thickness of the camera in the direction of the optical axis J1 yet further.

Variant Embodiment #2

Figure 6:
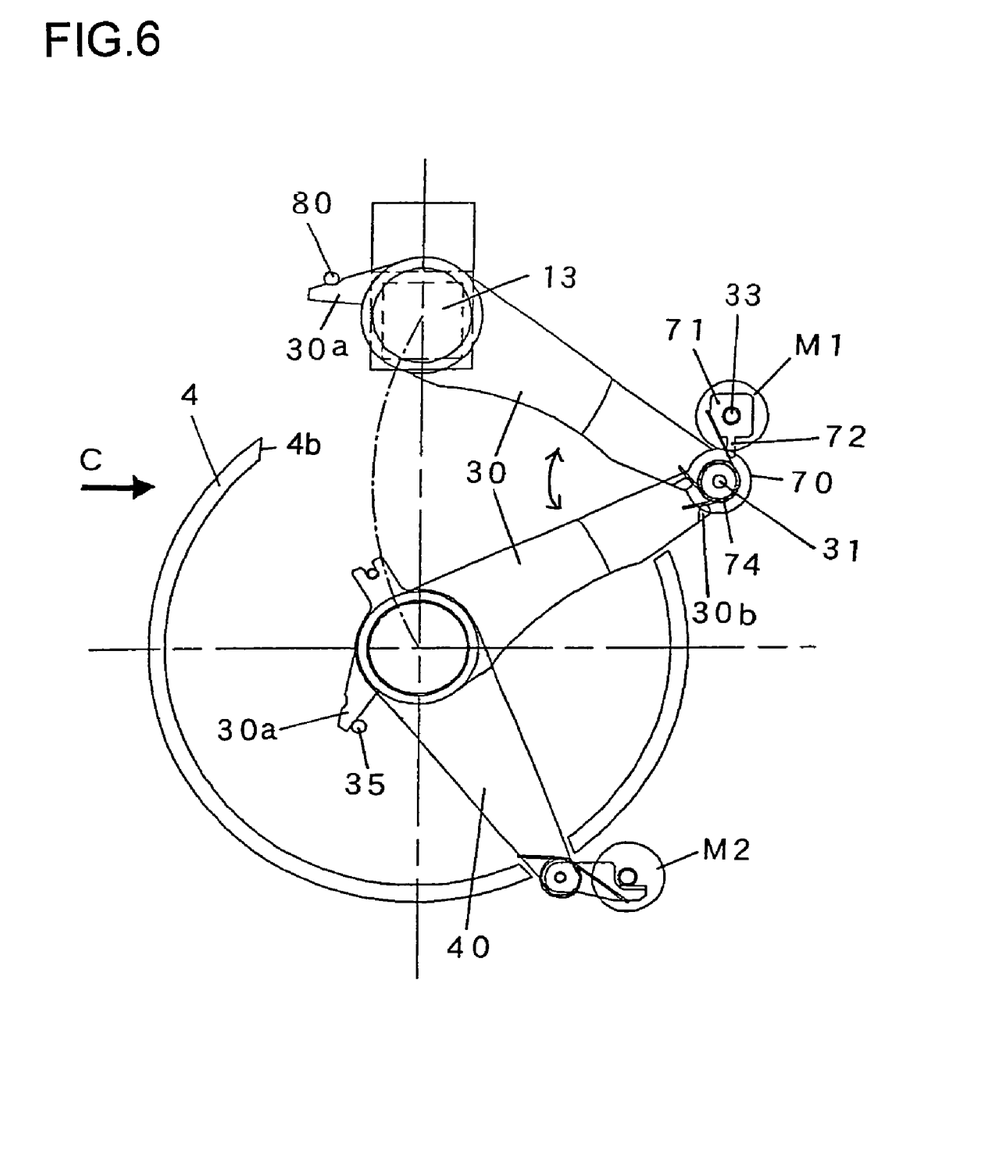
FIG. 6 is a figure for explanation of a second variant embodiment, and is a figure showing a third lens group and a fourth lens group as seen from the front of the camera.
Figure 7:
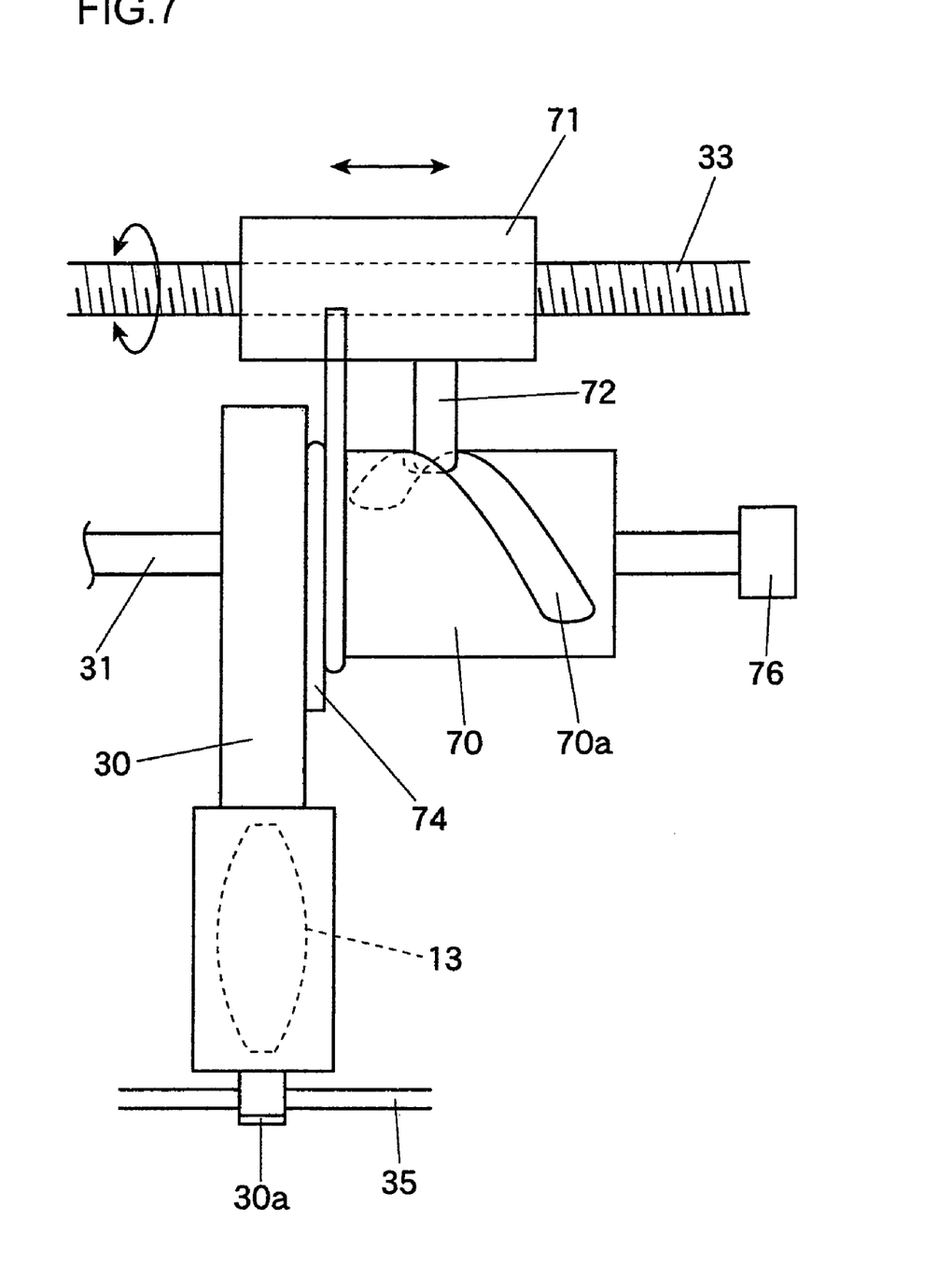
FIG. 7 is a view of the FIG. 6 mechanism as seen from a direction C.

FIGS. 6 and 7 are figures showing a second variant embodiment; FIG. 6 is a figure showing a third lens group 13 and a fourth lens group 14 as seen from the front of the camera, while FIG. 7 is a view of the FIG. 6 mechanism as seen from a direction C in that figure. In the case of this variant embodiment #2 as well, similarly to the case of variant embodiment #1, it is possible to shift the third lens group 13 between the photographic optical axis J1 and the projection optical axis J2 without changing the position of the lens frame 30 along the direction of the optical axis.

In this variant embodiment #2, it is arranged to drive the lens frame 30 to swing with a cylinder cam 70 and with a pin 72 that is provided to a rack 71. The cylinder cam 70 and the lens frame 30 are one unitary element, and the lens frame 30 is driven to and fro by rotation of the cylinder cam 70. In the case of this variant embodiment #2, along with the lens frame 30 and the cylinder cam 70 being rotated as one member with respect to the rod 31, also they are provided so as to be capable of sliding along the rod 31.

The rack 71 is pillar shaped, and a female screw that is formed through the center of this rack 71 is engaged upon a lead screw 33 by being screwed thereover. The cam pin 72 is provided upon the side surface of the rack 71, and this cam pin 72 is inserted into a cam groove 70a of the cylinder cam 70. A torsional coil spring 74 fulfils a function similar to that of the torsional coil spring 34 described above, and biases the lens frame 30 in the anticlockwise direction. One end of this spring 74 is engaged upon a claw 30b of the lens frame 30, while its other end is engaged with the rack 71.

Figure 8A:
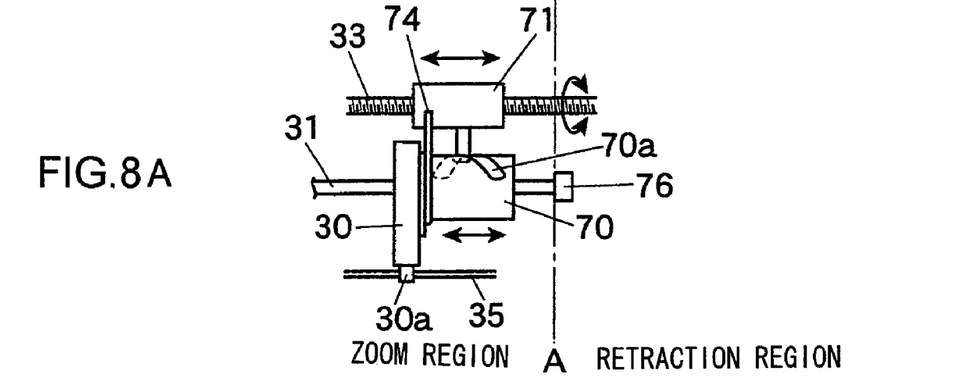
FIG. 8A shows a case when a third lens group is in a zoom region.
Figure 8B:
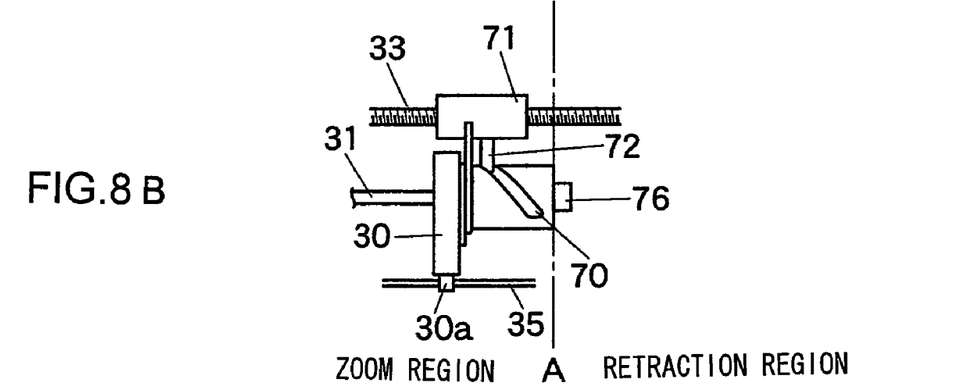
FIG. 8B shows a case when this third lens group is in its initial position A.
Figure 8C:
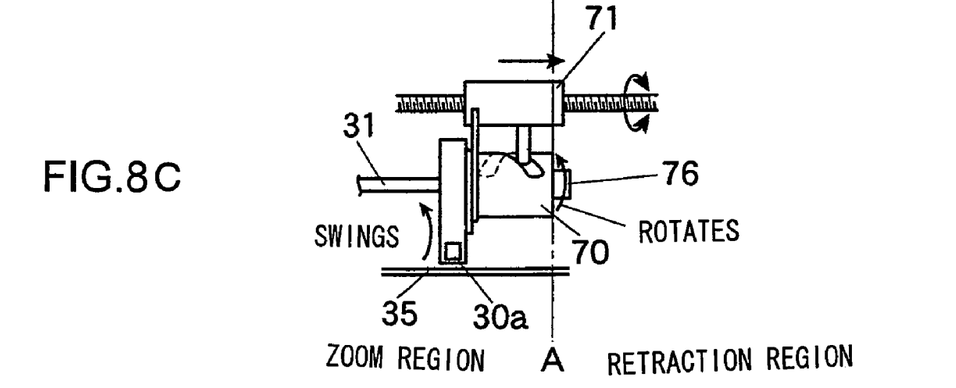
FIG. 8C shows a case when a lens frame is performing a swing operation.

FIGS. 8A through 8C are figures for explanation of the swing operation of the lens frame 30: FIG. 8A shows the case when the third lens group 13 is in a zoom region; FIG. 8B shows the case when this third lens group 13 is in its initial position A; and FIG. 8C shows the case when the lens frame 30 is performing its swing operation. In the zoom region of FIG. 8A, as described above, the lens frame 30 is biased in the anticlockwise direction by the spring 74, and the claw 30a contacts against a pin 35 that extends in the direction of the photographic optical axis J1. In other words, both the lens frame 30 and the integral cylinder cam 70 are biased in the anticlockwise direction. Due to this, when the rack 71 shifts in rectilinear motion along the direction of the photographic optical axis J1, the cylinder cam 70 and the lens frame 30 do not rotate, but shift together with the rack 71 by sliding along the rod 31.

When the rack 71 is driven towards the rear of the camera (i.e. to the right as seen in the figure) and, as shown in FIG. 8B, the lens frame 30 is brought to its initial position A, the end surface of the cylinder cam 70 contacts against the position determination member 76. And when, as shown in FIG. 8C, the rack 71 is further retracted, the cylinder cam 70 is rotationally driven in the clockwise direction.

As a result, the lens frame 30 is driven so as to swing around the rod 31 as a center, and its claw 30a is removed from the pin 35, so that the third lens group 13 is driven to swing away from being upon the photographic optical axis J1 to be upon the projection optical axis J2. The lens frame 30 is driven so as to swing until the claw 30a contacts against a pin 80 (refer to FIG. 6) that is provided upon the projector unit, and the position of the third lens group 13 is regulated to be upon the projection optical axis J2 by this contacting against the pin 80. In the case of this variant embodiment #2 as well, a similar advantageous effect is obtained as in the case of variant embodiment #1.

It should be understood that although, with the camera described above, the photographic lens was made up of four lens groups, this should not be considered as being limitative of the present invention. Furthermore, the present invention is not limited by any of the features of the embodiments described above, provided that its defining feature is not departed from.

As explained above, with these cameras according to the various embodiments of the present invention, it is possible to keep the cost down, since at least one of the plurality of lenses in the photographic optical system also serves as a projection lens.

The above-described embodiments are examples, and various modifications can be made without departing from the scope of the invention.

What is claimed is:

1. A camera, comprising:
  a photographic optical system that comprises a plurality of lenses;
  an image sensor that captures an image of a photographic subject formed through the photographic optical system;
  a projection lens unit that projects an image for projection via a projection lens unit, with at least one lens being common to the plurality of lenses of the photographic optical system and to the projection lens unit; and
  a shift mechanism that sets the at least one common lens to one of a first position upon an optical axis of the photographic optical system and a second position upon an optical axis of the projection lens unit.

2. A camera according to claim 1, wherein:
  the projection lens unit comprises a plurality of lenses; and
  the common lens serves both as at least one lens among the plurality of lenses of the photographic optical system and as at least one lens of the projection lens unit.

3. A camera according to claim 1, wherein:
  the shift mechanism shifts the common lens within a plane that is orthogonal to the optical axes, and selectively positions the common lens to the first position or the second position.

4. A camera according to claim 1, wherein:
  the camera is a retractable type camera in which a lens barrel comprising the photographic optical system is to be retracted within a camera body, and
  when the lens barrel is retracted, the common lens is positioned by the shift mechanism to the second position.

5. A camera according to claim 1, wherein:
  the shift mechanism positions the common lens to the first position or to the second position by rotating the common lens around a rod disposed in parallel with the optical axes, as a center.

6. A camera according to claim 5, wherein:
  the shift mechanism comprises a cam mechanism that comprises a claw formed upon a lens frame that supports the common lens and a cam member, and rotates the lens frame by driving one of the lens frame and the claw along a direction of the optical axes, with the claw contacting against a sloping surface of the cam member.

* * * * *